(12) United States Patent
Ochiai et al.

(10) Patent No.: US 12,229,942 B2
(45) Date of Patent: Feb. 18, 2025

(54) IMAGE PROCESSING APPARATUS, IMAGE PROCESSING METHOD, AND MEDIUM

(71) Applicant: CANON KABUSHIKI KAISHA, Tokyo (JP)

(72) Inventors: Takashi Ochiai, Tokyo (JP); Hiroki Watabe, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 348 days.

(21) Appl. No.: 17/751,310

(22) Filed: May 23, 2022

(65) Prior Publication Data

US 2022/0383471 A1 Dec. 1, 2022

(30) Foreign Application Priority Data

May 31, 2021 (JP) .................................. 2021-091747

(51) Int. Cl.
*G06T 7/00* (2017.01)
*G06T 7/73* (2017.01)

(52) U.S. Cl.
CPC ............... *G06T 7/001* (2013.01); *G06T 7/74* (2017.01); *G06T 2207/10008* (2013.01); *G06T 2207/30144* (2013.01)

(58) Field of Classification Search
None
See application file for complete search history.

(56) References Cited

U.S. PATENT DOCUMENTS

2018/0103171 A1* 4/2018 Fukushima .......... H04N 1/0288
2022/0286576 A1* 9/2022 Ishitsuka ............ H04N 1/32625

FOREIGN PATENT DOCUMENTS

| JP | 10336428 A | * 12/1998 |
| JP | H10336428 A | 12/1998 |
| JP | 2023039140 A | * 3/2023 |

* cited by examiner

*Primary Examiner* — Delomia L Gilliard
(74) *Attorney, Agent, or Firm* — Canon U.S.A., Inc. IP Division

(57) ABSTRACT

An image processing apparatus includes an acquisition unit configured to acquire a read image obtained by reading a printed document, and a determination unit configured to determine presence or absence of a streak included in the read image, by tracking a contour of the printed document from each of a plurality of points that are both end points of the read image in a direction orthogonal to a reading direction of the read image.

13 Claims, 15 Drawing Sheets

SCAN DIRECTION

SCAN DIRECTION

SCAN DIRECTION

SCAN DIRECTION

SCAN DIRECTION

SCAN DIRECTION

SCAN DIRECTION

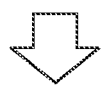
FIG.14A
SCAN DIRECTION
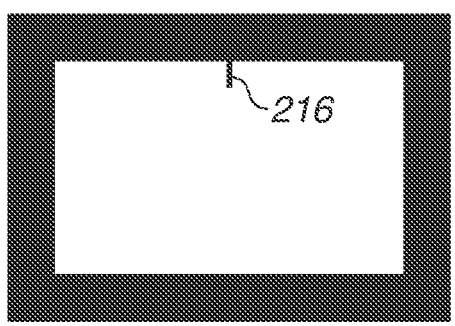
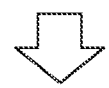
FIG.14B
SCAN DIRECTION
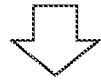
FIG.14C
SCAN DIRECTION
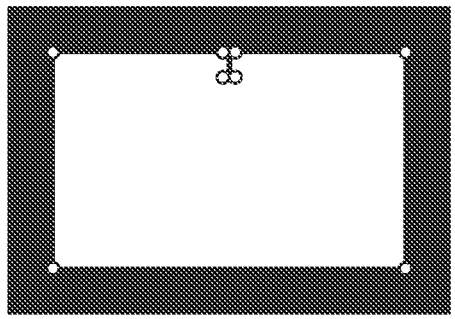
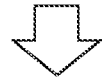
FIG.14D
SCAN DIRECTION
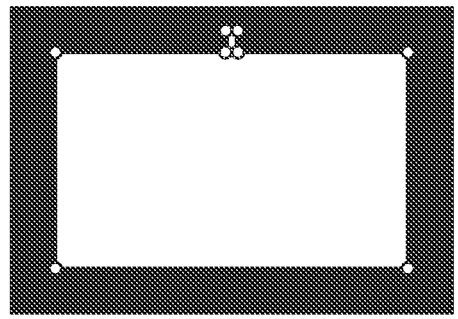

12,229,942 B2

IMAGE PROCESSING APPARATUS, IMAGE PROCESSING METHOD, AND MEDIUM

BACKGROUND

Field of the Disclosure

The present disclosure relates to an image processing technique for inspecting a printed document.

Description of the Related Art

There have been conventionally known inspection apparatuses that automatically inspect the quality of a printed document. The inspection apparatuses inspect a printed document by comparing a reference image for inspection of the printed document with an inspection target image that is obtained by scanning the printed document by using a sensor.

To align the reference image and the inspection target image as a preliminary preparation for the inspection, a group of contour points indicating a contour and apexes of a sheet is used as reference points in some cases. As a technique of extracting the group of contour points of the sheet, Japanese Patent Application Laid-Open No. 10-336428 discusses a contour tracking technique for tracking the contour of a sheet starting from a sampling point in a scan image to detect apex coordinates of the sheet.

SUMMARY

According to embodiments of the present disclosure, an image processing apparatus includes an acquisition unit configured to acquire a read image obtained by reading a printed document, and a determination unit configured to determine presence or absence of a streak included in the read image, by tracking a contour of the printed document from each of a plurality of points that are both end points of the read image in a direction orthogonal to a reading direction of the read image.

Further features of the present disclosure will become apparent from the following description of exemplary embodiments with reference to the attached drawings.

BRIEF DESCRIPTION OF THE DRAWINGS

FIGS. 14A to 14D each illustrate an example of an inspection target image according to the third exemplary embodiment.

DESCRIPTION OF THE EMBODIMENTS

Figure 1:
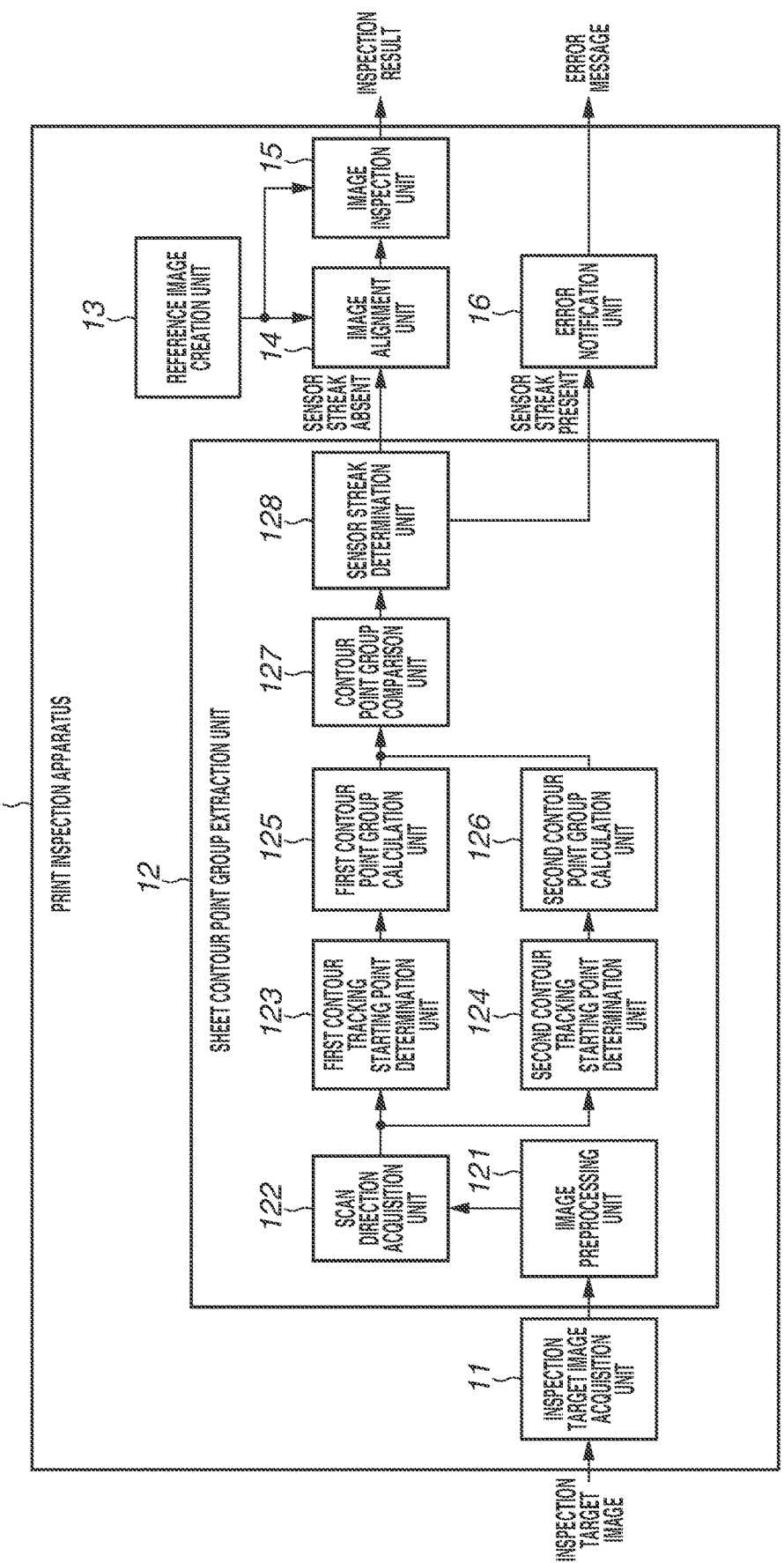
FIG. 1 is a block diagram illustrating a configuration of a print inspection apparatus.

In a case where an inspection target image read by a sensor includes a sensor streak caused by various kinds of noise factors such as failure of the sensor, attachment of a dust like paper powder, and stain, the existing technique cannot correctly return a direct cause of an error. More specifically, when contour tracking of a sheet area is started from one starting point, extraction of a sheet contour fails, and an error unrelated to a sensor streak occurs.

For example, in a case where the sensor streak is a black streak, the black streak occurs such that the sheet area is divided thereby. Thus, as a result of the contour tracking, a sheet area smaller than the actual sheet area is extracted, and an error message notifying a sheet size error is issued.

In contrast, in a case where the sensor streak is a white streak, the white streak occurs such that the sheet area is corrupted. Thus, during the contour tracking, a tracking point moves off the sheet area and extends into the end portion of the scan image, and an error message notifying an extension error is issued.

As a result of such issues, even in a case where the error is a reading error caused by the sensor, it is not possible to notify a user, an inspection apparatus, or a printing apparatus that the error is derived from the sensor. Therefore, an appropriate procedure such as maintenance of the sensor cannot be performed, which may result in a defect that causes frequent occurrence of inspection errors.

Since the user, the inspection apparatus or the printing apparatus is not notified that the error is derived from the sensor streak, it also prevents continuation of the inspection with the portion where the sensor streak has occurred excluded.

Some exemplary embodiments are described below with reference to drawings. The following exemplary embodiments do not limit the present disclosure, and all of combinations of features described in the exemplary embodiments are not deemed to be necessarily essential. In addition, various modes within a scope not departing from the spirit of the present disclosure are also included in embodiments of the present disclosure, and the following exemplary embodiments can be partially combined as needed.

In a first exemplary embodiment, when sheet contour tracking is performed on the inspection target image, two starting points for contour extraction are set such that the inspection target image is sandwiched by the starting points on the both sides in a direction perpendicular to a direction in which a sensor streak may occur. Here, the description is given of an example in which positional coordinates of apexes that are calculated from contours extracted by tracking from the respective starting points are compared. In a case where the positional coordinates of the apexes calculated from the contours extracted by tracking from the respective starting points are not coincident with each other, it is regarded that a sensor streak causes division or a corruption of the sheet area, and an error indicating the presence of a sensor streak is notified.

Configuration of Print Inspection Apparatus

FIG. 1 is a block diagram illustrating a configuration of a print inspection apparatus.

A print inspection apparatus 1 is an image processing apparatus. The print inspection apparatus 1 receives an inspection target image, and outputs an inspection result and an error message. The print inspection apparatus 1 includes an inspection target image acquisition unit 11, a sheet contour point group extraction unit 12, a reference image creation unit 13, an image alignment unit 14, an image inspection unit 15, and an error notification unit 16. Functions of the units are described below.

The inspection target image acquisition unit 11 acquires an inspection target image that is a read image acquired by a sensor reading a printed document printed by a printing apparatus. At this time, the inspection target image including a sheet area and a peripheral area thereof is read by using, for example, an inline sensor of 600 dpi. The peripheral area corresponds to, for example, a surface portion of a conveyance belt on which the inspection target image is set, and desirably has a color high in contrast with the color of the sheet. The reading resolutions of the inspection target image may be different between a vertical direction and a lateral direction. Further, for example, in a case of an inspection requiring high speed processing like a real-time inspection, the inspection target image acquisition unit 11 may be configured to perform print inspection processing immediately after a printing unit of the printing apparatus performs processing.

The sheet contour point group extraction unit 12 extracts contour points of the sheet from the inspection target image. The contour points used herein indicate apexes at four corners of the sheet in a case where the contour of the sheet is correctly extracted. At this time, the sheet contour point group extraction unit 12 includes an image preprocessing unit 121, a scan direction acquisition unit 122, a first contour tracking starting point determination unit 123, a second contour tracking starting point determination unit 124, a first contour point group calculation unit 125, a second contour point group calculation unit 126, a contour point group comparison unit 127, and a sensor streak determination unit 128.

The image preprocessing unit 121 performs preprocessing on the inspection target image. At this time, to enable the sheet contour point group extraction unit 12 to perform the contour tracking, the image preprocessing unit 121 performs binarization processing converting the inspection target image into a monochrome binary image. The contour tracking may be performed on an image other than the monochrome binary image, for example, a monochrome multivalue image. In this case, the inspection target image is converted into an image in an image format enabling the contour tracking. When the contour tracking is performable without the preprocessing, the preprocessing is not essential and may be skipped. Further, in a case where a reference image and the inspection target image are different in resolution, image preprocessing unit 121 converts the resolution of the inspection target image into a resolution the same as the resolution of the reference image.

The scan direction acquisition unit 122 acquires a scan direction when the inspection target image is read by the sensor. The scan direction indicates a direction in which the inspection target image is relatively scanned by the sensor, and is any of a vertical direction (perpendicular direction) or a lateral direction (horizontal direction) of the inspection target image. In the following description and the drawings, the scan is performed in the vertical direction every time. The scan at this time may be performed in a direction from top to bottom or a direction from bottom to top. The scan is normally performed in one direction. Thus, it is unnecessary to acquire the scan direction every time the inspection target image is acquired. In a case where the scan direction is known in advance, information on the scan direction may be stored in advance, and the processing by the scan direction acquisition unit may be skipped.

The first contour tracking starting point determination unit 123 determines a first starting point when the contour tracking is performed on the inspection target image. The first contour tracking starting point determination unit 123 determines the first starting point on one side of the inspection target image in a direction perpendicular to the scan direction in which a sensor streak may occur.

The second contour tracking starting point determination unit 124 determines a second starting point when the contour tracking is performed on the inspection target image. The second contour tracking starting point determination unit 124 determines the second starting point on the other side opposite to the first starting point in the direction perpendicular to the scan direction in which a sensor streak may occur such that the inspection target image is between the first starting point and the second starting point.

The first contour point group calculation unit 125 calculates first contour points obtained by performing the contour tracking from the first starting point.

The second contour point group calculation unit 126 calculates second contour points obtained by performing the contour tracking from the second starting point.

The contour point group comparison unit 127 compares positional coordinates of the first contour points and positional coordinates of the second contour points.

The sensor streak determination unit 128 determines presence or absence of a sensor streak based on a result of the comparison by the contour point group comparison unit 127.

The reference image creation unit 13 creates the reference image. The reference image corresponds to a sample image as a reference in the inspection, and is raster image processor (RIP) data created at printing, or data that is obtained by processing the RIP data by using various kinds of image processing filters and by performing color conversion processing so as to bring the RIP data close to a print image. The reference image can be also image data created by scanning and combining a plurality of printed documents. In a case where the same image is continuously inspected, it is unnecessary to create the reference image each time. The reference image creation unit 13 may skip creating a reference image and refer to a reference image separately stored in a memory or the like.

The image alignment unit 14 aligns the reference image with the inspection target image based on the contour points of the sheet.

The image inspection unit 15 inspects whether a defect is included in the inspection target image by comparing the reference image and the inspection target image mutually aligned. The comparison here is performed by calculating a difference image.

The error notification unit 16 make a notification of an error in a case where a sensor streak occurs.

The print inspection apparatus 1 may be a single independent apparatus, or may be incorporated in the printing apparatus as a unit of the printing apparatus. The print inspection apparatus 1, and a processing flow and algorithm described below are operated by a personal computer (PC), a dedicated calculator, or an incorporated circuit inside the printing apparatus. The units, methods, and algorithms are realized as software or hardware. The calculations of the units are performed by a calculation device such as a central processing unit (CPU) and a graphics processing unit (GPU), and data to be used is read from and written into a memory, such as a random access memory and a read only memory, or a hard disk drive (HDD) having a large capacity storage, connected to the PC. A printed document to be inspected is read (scanned) by a reading apparatus such as a line sensor, a scanner, and a camera provided in the print inspection apparatus 1 or the printing apparatus. The data is input and output by using an input device such as a keyboard and a mouse, or a display apparatus such as a monitor.

Flow of Print Inspection Processing

Figure 2:
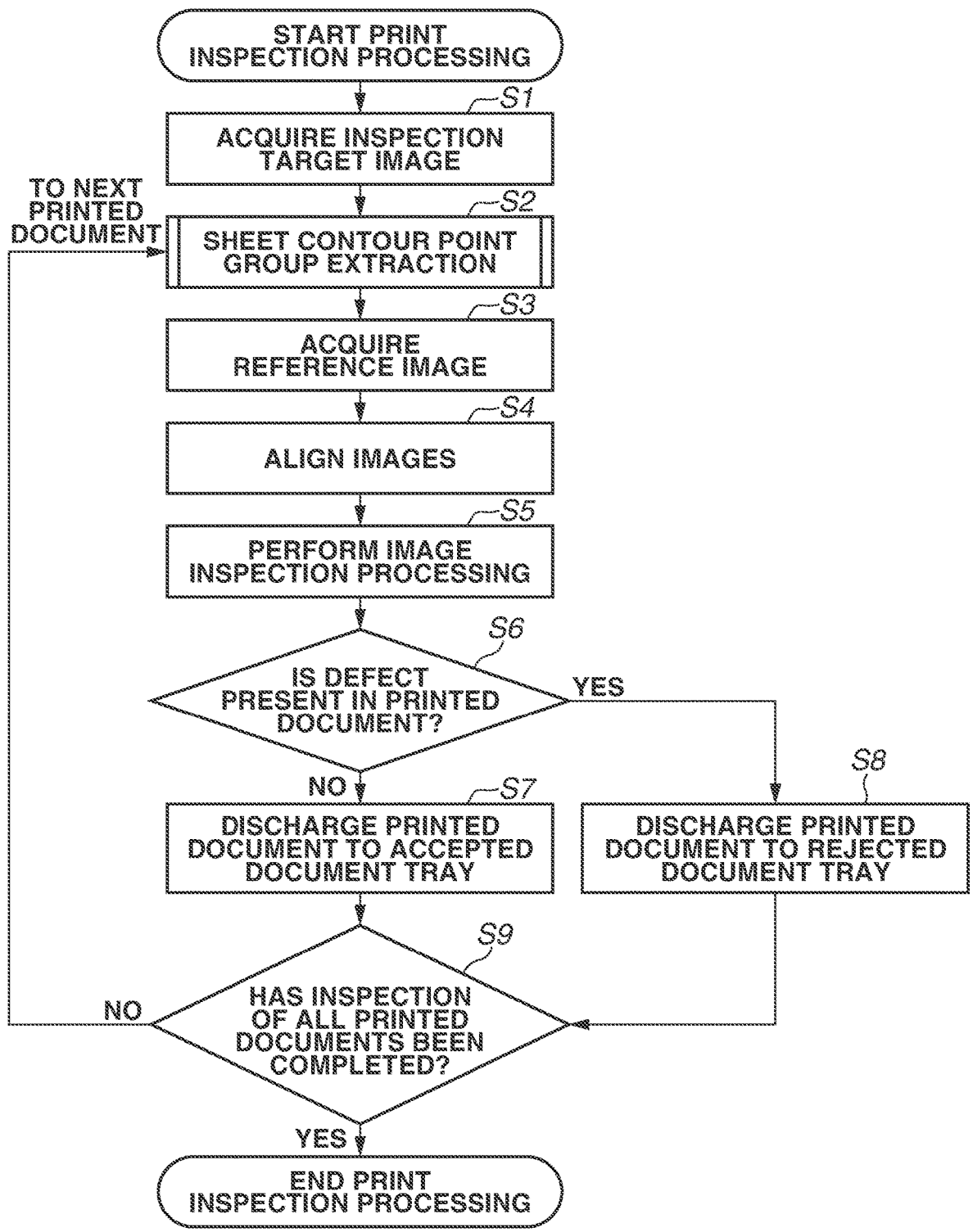
FIG. 2 is a flowchart illustrating processing performed by the print inspection apparatus.

FIG. 2 is a flowchart illustrating a procedure of processing performed by the print inspection apparatus. The description is given below based on the flowchart.

After the start of print inspection processing, in step S1, an inspection target image is acquired by reading a printed document printed by the printing apparatus, by using a sensor. The inspection target image is acquired such that the sheet area and the peripheral area thereof is included therein.

In step S2, sheet contour points are extracted. The detailed processing procedure is described below.

In step S3, the reference image created by the reference image creation unit 13 is acquired. Reference images equal in number to inspection target images are created before the inspection and are referred to at alignment with the inspection target images and at the image inspection. Alternatively, only one reference image may be prepared and used for alignment with each of inspection target images in the subsequent step. At the same time when the reference image is acquired, sheet contour points of the reference image are also acquired, and are used for alignment.

Next, in step S4, each inspection target image and a corresponding reference image are aligned based on the sheet contour points of the inspection target image extracted in step S2 and the sheet contour points of the reference image acquired in step S3. At this time, sheet apexes are used as the sheet contour points. The alignment of the images is performed by using various kinds of well-known alignment techniques such as affine transformation.

In step S5, image inspection processing is performed. In the image inspection processing, difference between the reference image and the inspection target image mutually aligned is calculated to inspect presence or absence of a defect.

In step S6, it is determined whether a defect is present in the printed document. Based on a pixel in which the difference determined in step S5 is greater than or equal to a predetermined threshold, it is determined that a defect is present in the printed document. Based on a pixel in which the difference is less than the predetermined threshold, it is determined that a defect is absent in the printed document. In a case where it is determined that a defect is absent (NO in step S6), the processing proceeds to step S7. In step S7, the printed document is discharged to an accepted document tray, and the processing proceeds to step S9. In contrast, in a case where it is determined that a defect is present as a result of the image inspection processing in step S5 (YES in step S6), the processing proceeds to step S8. In step S8, the printed document is discharged to a rejected document tray, and the processing proceeds to step S9.

Finally, in step S9, it is determined whether inspection of all of the printed documents has been completed. In a case where inspection of all of the printed documents has not been completed (NO in step S9), the processing returns to step S2, and inspection of the next printed document is continuously carried out. In a case where inspection of all of the printed documents has been completed (YES in step S9), the print inspection processing ends.

The description of the flowchart of FIG. 2 ends.

Flow of Sheet Contour Point Group Extraction Processing

Figure 3:
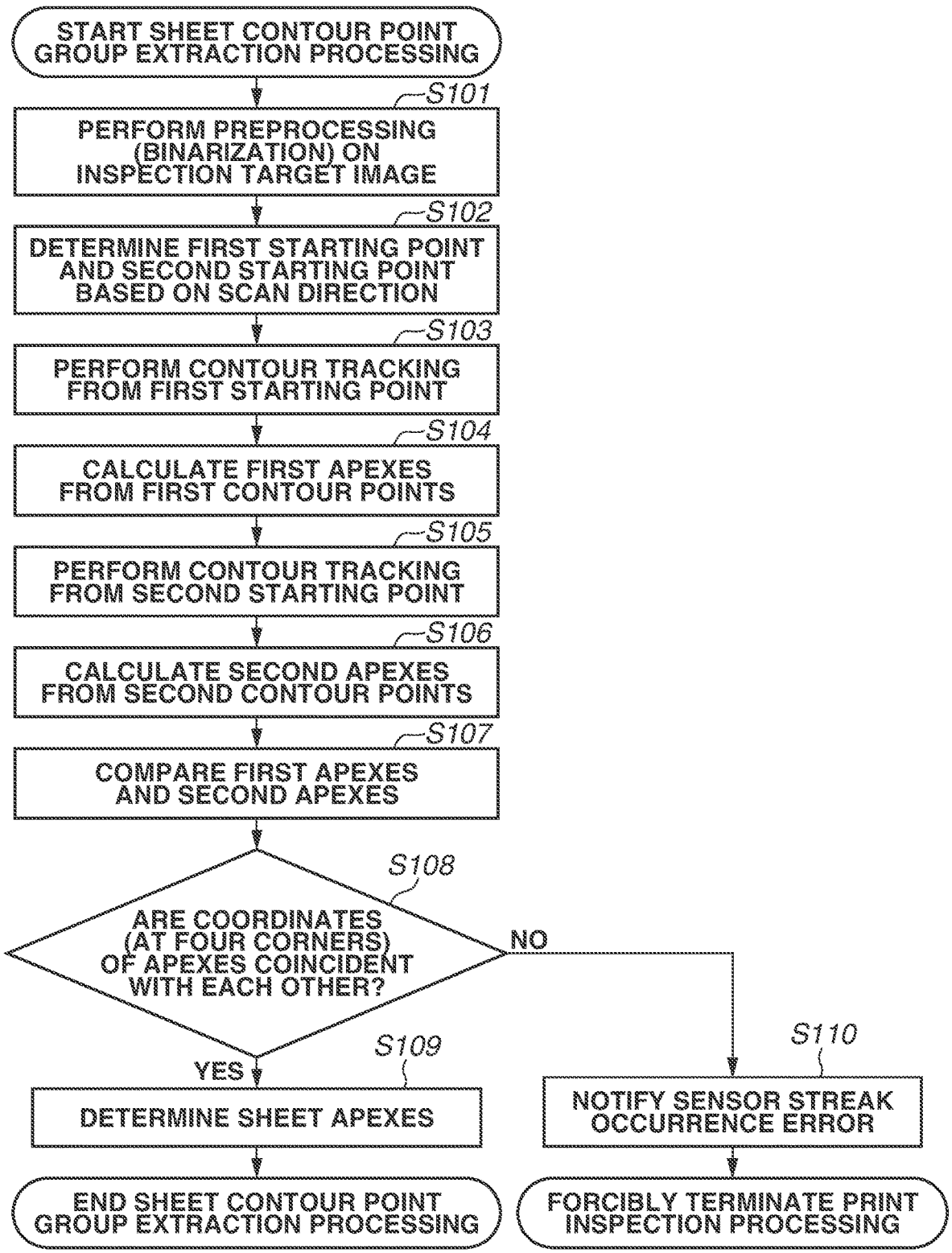
FIG. 3 is a flowchart illustrating sheet contour point group extraction processing.

FIG. 3 is a flowchart illustrating a detailed procedure of the sheet contour point group extraction processing in step S2. The description is given below based on the flowchart.

First, in step S101, preprocessing is performed on the inspection target image. At this time, to perform contour tracking in subsequent steps, the inspection target image is converted into a monochrome binary image. In the case where the reference image and the inspection target image are different in resolution, the resolution of the inspection target image is converted into a resolution the same as the resolution of the reference image.

In step S102, the first starting point and the second starting point are determined based on the scan direction acquired by the scan direction acquisition unit 122.

In step S103, the contour tracking is performed from the first starting point. The contour tracking is performed by using, for example, the 8-connected method or the 4-connected method.

In step S104, first apexes are calculated from the first contour points. At this time, as the contour points, apexes of the contour are calculated.

In step S105, the contour tracking is performed from the second starting point. As in step S103, the 8-connected method or the 4-connected method is used in the contour tracking.

In step S106, second apexes are calculated from the second contour points. As in step S104, apexes of the contour are calculated as the contour points.

In step S107, the first apexes and the second apexes are compared.

In step S108, it is determined whether the coordinates of the apexes (at four corners) are coincident with each other based on a result of the comparison in step S107. In a case where the coordinates of the apexes are coincident with each other (YES in step S108), the processing proceeds to step S109. In step S109, the apexes are determined as the sheet apexes to be used in the subsequent processing, and the sheet contour point group extraction processing ends. In contrast, in a case where the coordinates of the apexes are not coincident with each other (NO in step S108), the processing proceeds to step S110. In step S110, a sensor streak occurrence error is notified, and the print inspection processing is forcibly terminated.

The description of the flowchart of FIG. 3 ends.

Specific Example of Sheet Contour Point Group Extraction in Inspection Target Image A specific example of a series of processes in the sheet contour point group extraction of the inspection target image is described with reference to FIG. 4A to FIG. 7E.

FIGS. 4A to 4E are explanatory diagrams illustrating a specific example in a case where the positional coordinates of the first contour points and the positional coordinates of the second contour points are coincident with each other. This example corresponds to a case where a sensor streak is not included in the inspection target image.

Figure 4A:
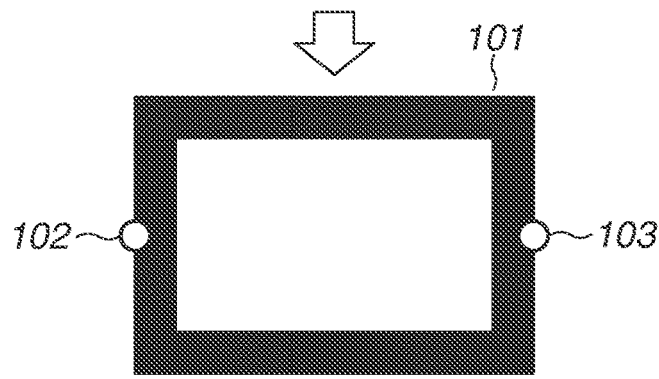
FIGS. 4A to 4E illustrate a specific example in a case where positional coordinates of first contour points and positional coordinates of second contour points are coincident with each other.

FIG. 4A illustrates a first starting point 102 and a second starting point 103 in an inspection target image 101. The first starting point 102 and the second starting point 103 are set as starting points for the contour extraction at the left and right ends of the inspection target image such that the inspection target image 101 is sandwiched between the first starting point 102 and a second starting point 103 in the direction (lateral direction) perpendicular to the scan direction (vertical direction in drawings) in which a sensor streak may occur. In other words, the first starting point 102 and the second starting point 103 are both end points of the read image, desirably both end points in the direction orthogonal to the scan direction.

Figure 4B:
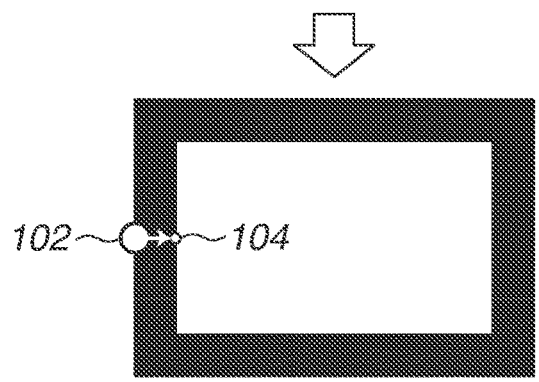

FIG. 4B illustrates a state where a search for the sheet contour is started from the first starting point 102 in an inward direction (right direction) of the inspection target image orthogonal to the scan direction, and the search reaches a point 104.

Figure 4C:
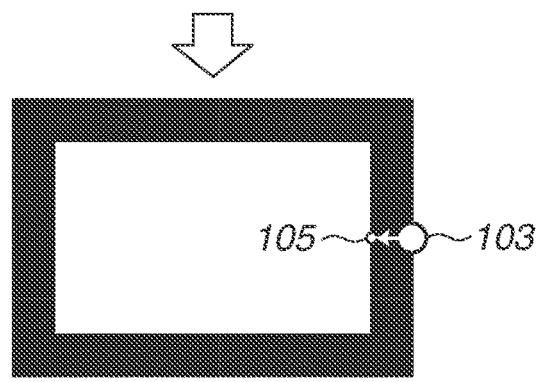

FIG. 4C illustrates a state where a search for the sheet contour is started from the second starting point 103 in an inward direction (left direction) of the inspection target image orthogonal to the scan direction, and the search reaches a point 105.

Figure 4D:
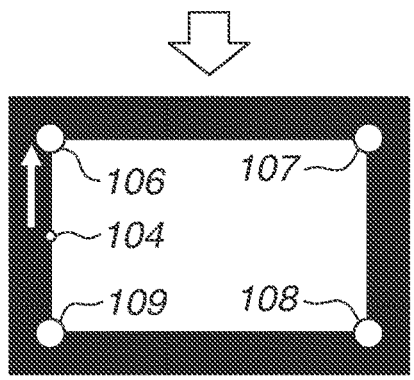

FIG. 4D illustrates a state where the contour tracking is started from the point 104, and contour points 106, 107, 108, and 109 are extracted.

Figure 4E:
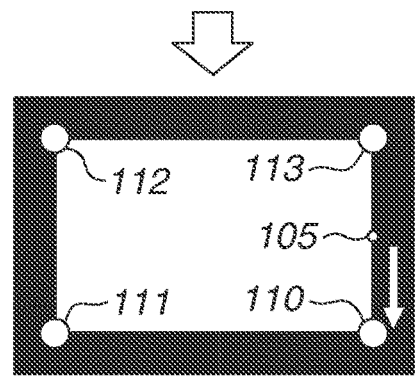

FIG. 4E illustrates a state where the contour tracking is started from the point 105, and contour points 110, 111, 112, and 113 are extracted.

It is found from comparison between FIG. 4D and FIG. 4E that positional coordinates of the first contour points and corresponding positional coordinates of the second contour points are coincident with each other. These contour points correspond to apexes at four corners of the sheet. As described above, in the case where a sensor streak is not included in the inspection target image, the positional coordinates of the first contour points and the positional coordinates of the second contour points are coincident with each other.

FIGS. 5A to 5E are explanatory diagrams illustrating a specific example in a case where the positional coordinates of the first contour points and the positional coordinates of the second contour points are not coincident with each other. This example corresponds to a case where a sensor black streak 117 occurs in the inspection target image.

Figure 5A:
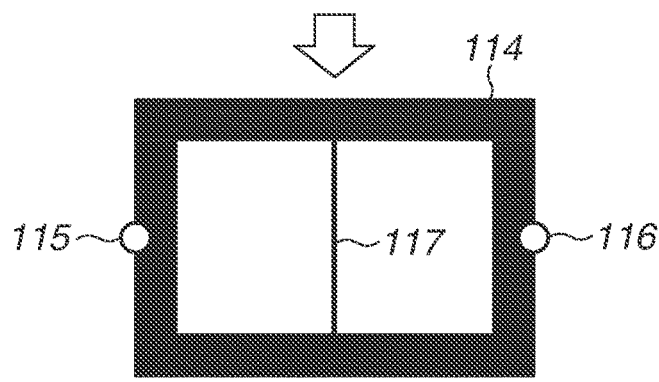
FIGS. 5A to 5E illustrate a specific example in a case where the positional coordinates of the first contour points and the positional coordinates of the second contour points are not coincident with each other.

FIG. 5A illustrates a first starting point 115 and a second starting point 116 in an inspection target image 114. The first starting point 115 and the second starting point 116 are set as starting points for the contour extraction at left and right ends of the inspection target image such that the inspection target image 114 is sandwiched between the first starting point 115 and a second starting point 116 in the direction (lateral direction) perpendicular to the scan direction (vertical direction in drawings) in which a sensor streak may occur.

Figure 5B:
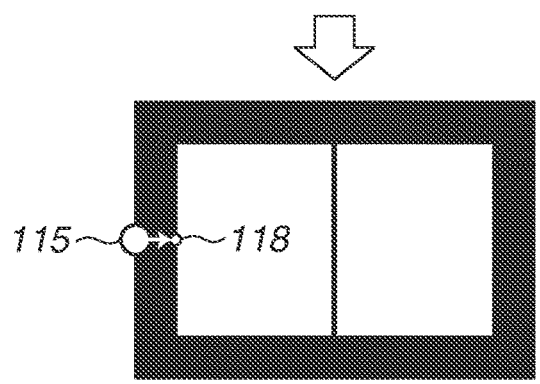

FIG. 5B illustrates a state where a search for the sheet contour is started from the first starting point 115 in an inward direction (right direction) of the inspection target image orthogonal to the scan direction, and the search reaches a point 118.

Figure 5C:
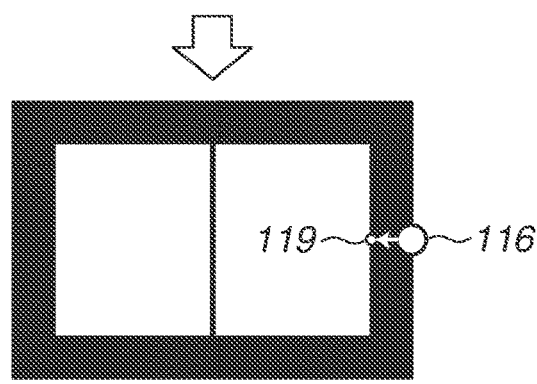

FIG. 5C illustrates a state where a search for the sheet contour is started from the second starting point 116 in an inward direction (left direction) of the inspection target image orthogonal to the scan direction, and the search reaches a point 119.

Figure 5D:
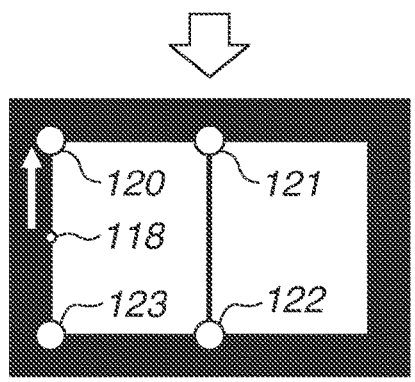

FIG. 5D illustrates a state where the contour tracking is started from the point 118, and contour points 120, 121, 122, and 123 are extracted.

Figure 5E:
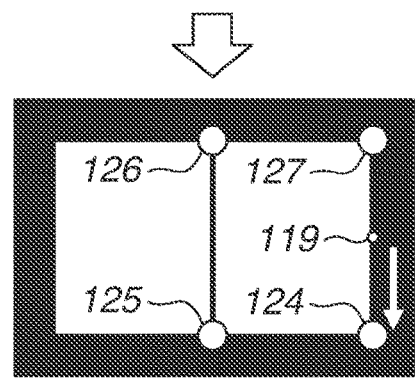

FIG. 5E illustrates a state where the contour tracking is started from the point 119, and contour points 124, 125, 126, and 127 are extracted.

It is found from comparison between FIG. 5D and FIG. 5E that positional coordinates of the first contour points and corresponding positional coordinates of the second contour points are not coincident with each other. As described above, in the case where a sensor black streak is included in the inspection target image, the positional coordinates of the first contour points and the positional coordinates of the second contour points are not coincident with each other.

FIGS. 6A to 6E are explanatory diagrams illustrating a specific example different from the specific example in FIGS. 5A to 5E in the case where the positional coordinates of first contour points and the positional coordinates of second contour points are not coincident with each other. This example corresponds to a case where a sensor white streak 131 occurs in the inspection target image.

Figure 6A:
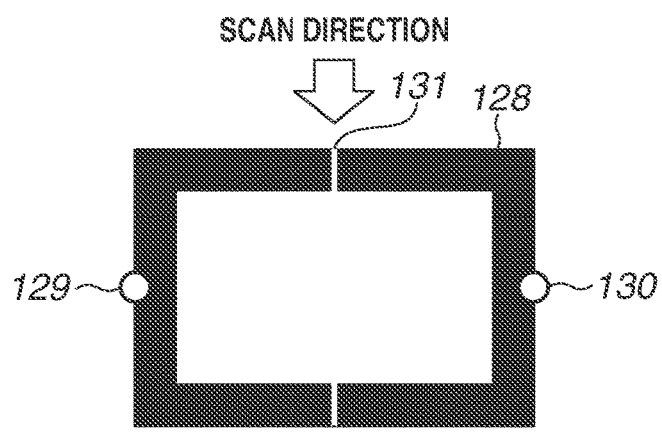
FIGS. 6A to 6E illustrate another specific example in the case where the positional coordinates of the first contour points and the positional coordinates of the second contour points are not coincident with each other.

FIG. 6A illustrates a first starting point 129 and a second starting point 130 in an inspection target image 128. The first starting point 129 and the second starting point 130 are set as starting points for the contour extraction at left and right ends of the inspection target image such that the inspection target image 128 is sandwiched between the first starting point 129 and a second starting point 130 in the direction (lateral direction) perpendicular to the scan direction (vertical direction in drawings) in which a sensor streak may occur.

Figure 6B:
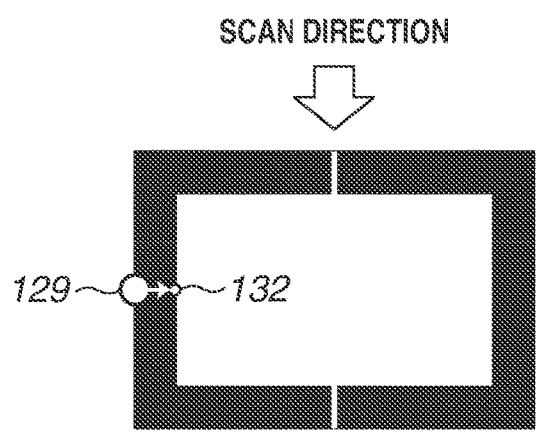

FIG. 6B illustrates a state where a search for the sheet contour is started from the first starting point 129 in an inward direction (right direction) of the inspection target image orthogonal to the scan direction, and the search reaches a point 132 corresponding to the end portion of the sheet.

Figure 6C:
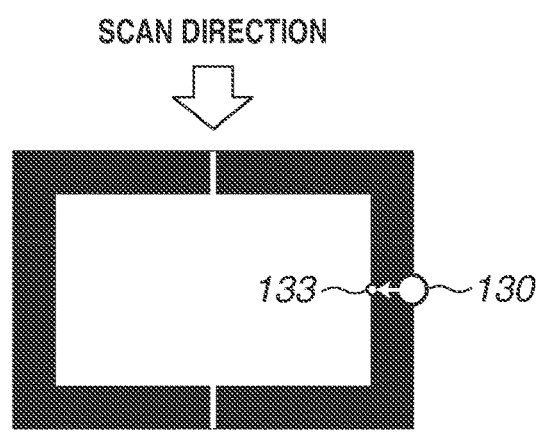

FIG. 6C illustrates a state where search for the sheet contour is started from the second starting point 130 in an inward direction (left direction) of the inspection target image orthogonal to the scan direction, and the search reaches a point 133 corresponding to the end portion of the sheet.

Figure 6D:
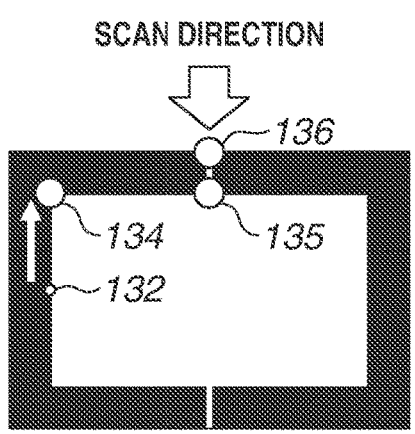

FIG. 6D illustrates a state where the contour tracking is started from the point 132, and contour points 134, 135, and 136 are extracted. In this example, the contour tracking ends when the tracking reaches the point 136 corresponding to the end portion of the inspection target image.

Figure 6E:
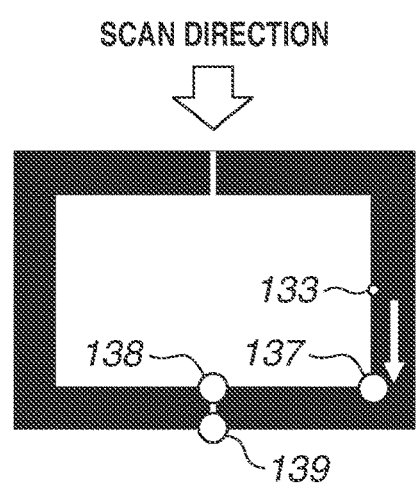

FIG. 6E illustrates a state where the contour tracking is started from the point 133, and contour points 137, 138, and 139 are extracted. In this example, the contour tracking also ends when the tracking reaches the point 139 corresponding to the end portion of the inspection target image.

It is found from comparison between FIG. 6D and FIG. 6E that positional coordinates of the first contour points and corresponding positional coordinates of the second contour points are not coincident with each other. As described above, in the case where the contour tracking ends when the tracking reaches the end portion of the inspection target image, i.e., in the case where a sensor white streak is included in the inspection target image, the positional coordinates of the first contour points and the positional coordinates of the second contour points are not coincident with each other.

FIGS. 7A to 7E are explanatory diagrams illustrating a specific example different from the specific examples in FIGS. 5A to 5E and FIGS. 6A to 6E in the case where the positional coordinates of first contour points and the positional coordinates of second contour points are not coincident with each other. This example corresponds to the case where the sensor white streak 131 occurs in the inspection target image as in FIGS. 6A to 6E. A difference from FIGS. 6A to 6E is that, even when the tracking reaches a point corresponding to the end portion of the inspection target image in the contour tracking, the contour tracking is not interrupted, and is continued until the tracking reaches the starting point for the contour tracking.

Figure 7A:
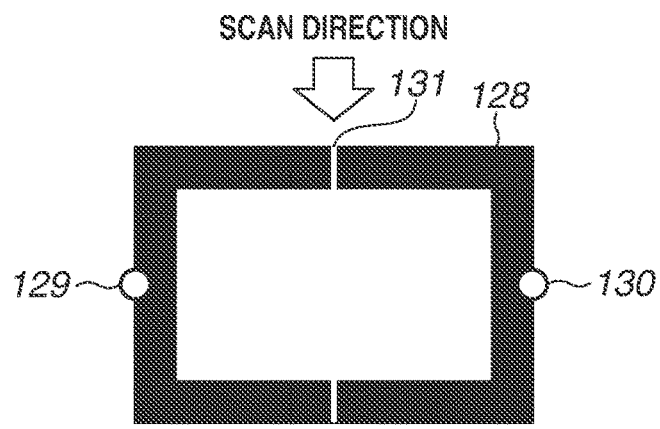
FIGS. 7A to 7E illustrate still another specific example in the case where the positional coordinates of the first contour points and the positional coordinates of the second contour points are not coincident with each other.

FIG. 7A illustrates the first starting point 129 and the second starting point 130 in the inspection target image 128. The first starting point 129 and the second starting point 130 are set as starting points for the contour extraction at the left and right ends of the inspection target image such that the inspection target image 128 is sandwiched between the first starting point 129 and a second starting point 130 in the direction (lateral direction) perpendicular to the scan direction (vertical direction in drawings) in which a sensor streak may occur.

Figure 7B:
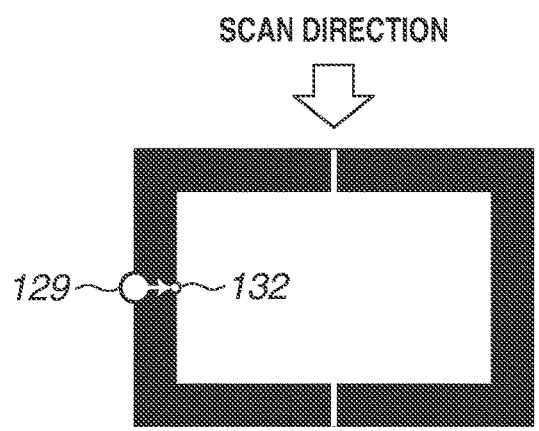

FIG. 7B illustrates a state where a search for the sheet contour is started from the first starting point 129 in an inward direction (right direction) of the inspection target image orthogonal to the scan direction, and the search reaches the point 132.

Figure 7C:
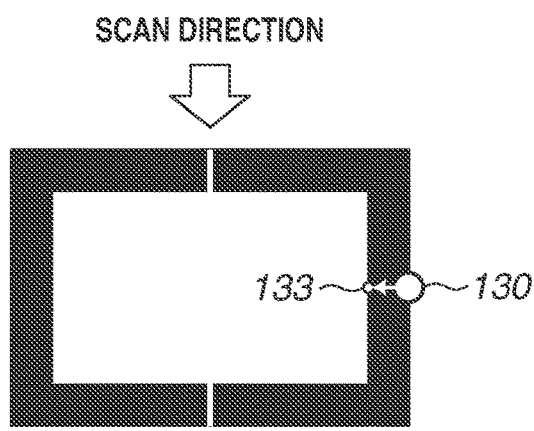

FIG. 7C illustrates a state where a search for the sheet contour is started from the second starting point 130 in an inward direction (left direction) of the inspection target image orthogonal to the scan direction, and the search reaches the point 133.

Figure 7D:
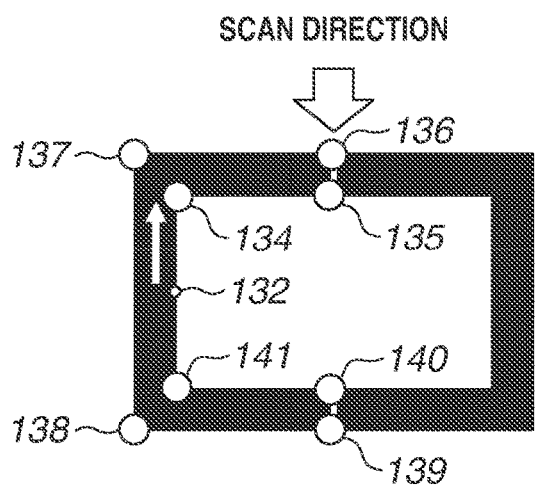

FIG. 7D illustrates a state where the contour tracking is started from the point 132, and eight contour points 134 to 141 are extracted. As described above, the contour tracking is continued even after the tracking reaches the end portion of the inspection target image.

Figure 7E:
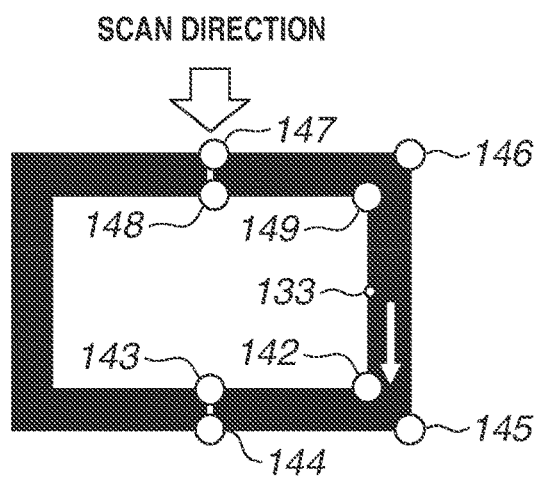

FIG. 7E illustrates a state where the contour tracking is started from the point 133, and eight contour points 142 to 149 are extracted. In this example, the contour tracking is also continued even after the tracking reaches the end portion of the inspection target image.

It is found from comparison between FIG. 7D and FIG. 7E that positional coordinates of the first contour points and corresponding positional coordinates of the second contour points are not coincident with each other. As described above, in the case where the contour tracking is continued even after the tracking reaches the end portion of the inspection target image, i.e., in the case where a sensor white streak is included in the inspection target image, the positional coordinates of the first contour points and the positional coordinates of the second contour points are not coincident with each other.

As described above by using the plurality of specific examples, the contour points extracted in the inspection target image are different depending on presence or absence of the sensor streak, and it is possible to distinguish presence or absence of the sensor streak based on whether the positional coordinates of the first contour points and the positional coordinates of the second contour points are coincident with each other.

Modifications

Various kinds of modifications are described.

The case where the number of starting points is two is described above as an example. Alternatively, three or more starting points may be set, the contour tracking may be performed from each of the starting points, and extracted contour points may be compared. In a case where all of the plurality of contour points and the corresponding points are not coincident with each other, a sensor streak occurrence error may be notified.

Further, the example in which the apexes among the extracted contour points are used as the first contour points and the second contour points is described; however, not only the apexes among the contour points but also all or a part of the contour points constituting the contour may be used. More specifically, it may be compared whether the first contour points and the second contour points are coincident with each other. Comparison of all of the contour points is equivalent to comparison of all processes in the contour tracking, and corresponds to comparison in terms of whether the tracking of the first contour points and the tracking of the second contour points each pass through the same contour and meets along the way.

In the contour tracking in steps S103 and S105 in FIG. 3, it is determined whether the coordinate of the contour tracking destination has reached the end portion of the inspection target image each time. In a case where the detection of contour points is completed to the end without reaching the end portion of the inspection target image, there is a low possibility that the sensor streak is a white streak. Thus, in step S110, the sensor streak is identified as a sensor black streak, and an error may be notified.

Further, the first starting point and the second starting point are desirably set such that the search is started in the inward direction of the inspection target image from both sides of a region where the printed document is present with high possibility in the inspection target image. In a case where a sheet size of the inspection target image is known in advance, the start positions of the search may be appropriately adjusted based on the sheet size.

In step S110, in place of notification of the sensor streak error and forcible termination of the inspection processing, a sensor streak occurrence portion may be set as an inspection target exclusion area, and the inspection processing may be continued on the other area where no sensor streak occurs. In this case, the inspection processing is not forcibly terminated when the sensor streak error is notified, and only a notification indicating occurrence of the sensor streak is issued, and the inspection processing is continued to the end.

Figure 8:
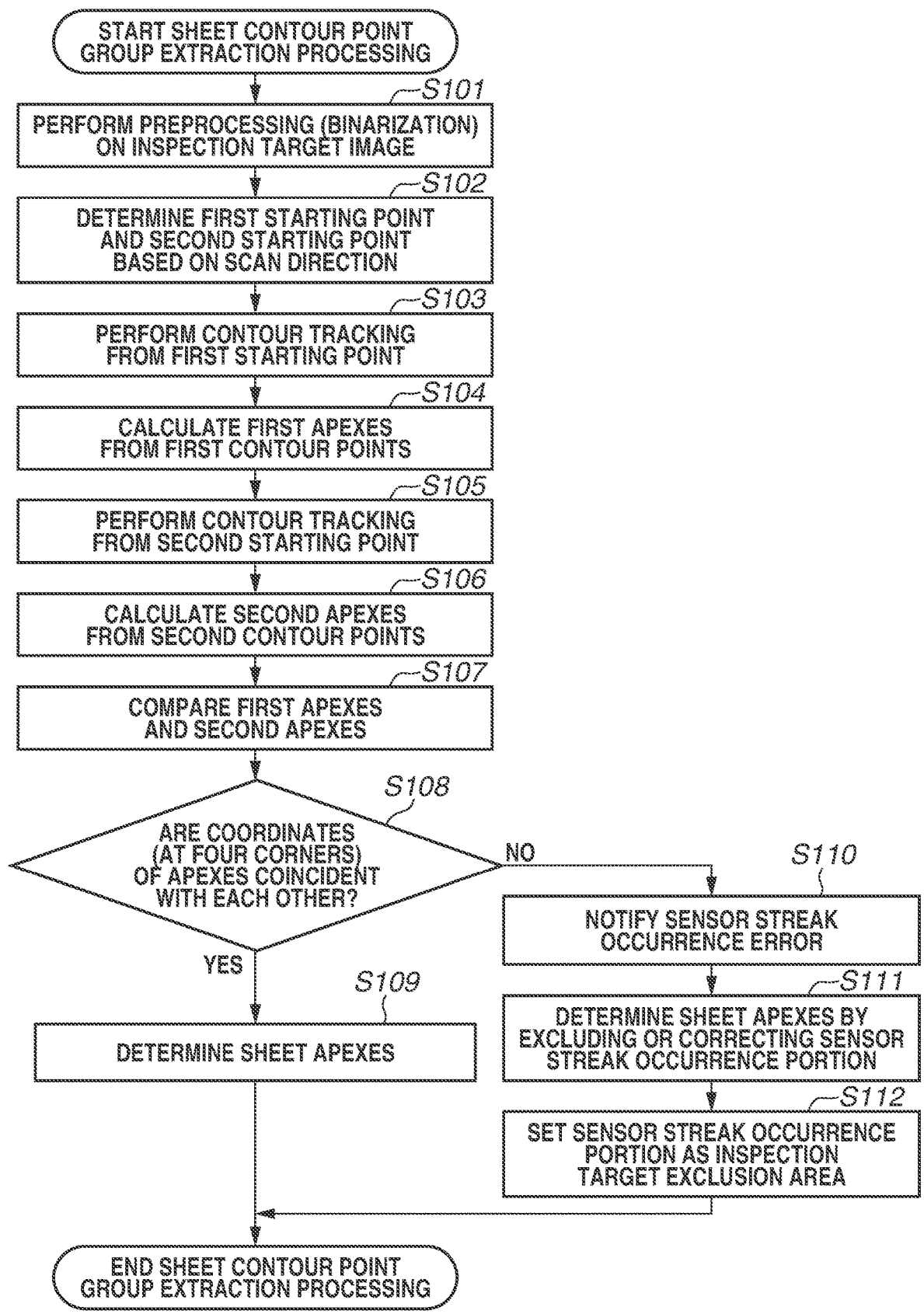
FIG. 8 is a flowchart illustrating processing performed in a case where inspection processing is continued with a sensor streak occurrence portion set as an inspection target exclusion area.

FIG. 8 is a flowchart illustrating a processing procedure in a case where the sensor streak occurrence portion is set as the inspection target exclusion area and the inspection processing is continued on the other area where no sensor streak occurs. In FIG. 8, in place of forcible termination of the print inspection processing after step S110 in the processing flow in FIG. 3, steps S111 and S112 are added. In step S111, the contour tracking is continued after avoiding or correcting the sensor streak occurrence portion, and the sheet apexes are determined. Next, in step S112, the sensor streak occurrence portion is set as the inspection target exclusion area.

As described above, in the first exemplary embodiment, when the contour tracking of the sheet is performed on the inspection target image, the plurality of starting points for the contour extraction is set at the both ends in lateral direction of the inspection target image such that the inspection target image is sandwiched between the starting points in the direction in which a sensor streak may occur, and the positional coordinates of the apexes calculated from the contours tracked from the respective starting points are compared. In the case where the positional coordinates of the apexes calculated from the contours tracked from the respective starting points are not coincident with each other, it is regarded that the sheet area is divided or corrupted by the sensor streak, and the sensor streak error is notified. According to the first exemplary embodiment, in the case where the sensor streak is included in the inspection target image, it is possible to correctly return the cause of an error when the sensor streak occurs. As a result, it makes it possible to perform an appropriate procedure such as maintenance of the sensor and to continue the inspection after avoiding the sensor streak occurrence portion.

In the first exemplary embodiment, in the case where the sensor streak is included in the inspection target image, the cause of the error when the sensor streak occurs can be correctly returned, but it is not possible to discriminate whether the type of the sensor streak is a black streak or a white streak. Accordingly, in a second exemplary embodiment, in addition to the processing according to the first exemplary embodiment, after the contour points are not coincident with each other, it is determined whether a contour tracking destination extends to the end portion of the inspection target image. In a case where the contour tracking destination does not extend to the end portion of the inspection target image, an error indicating presence of a sensor black streak is notified. In a case where the contour tracking destination extends to the end portion of the inspection target image and an extension width is small, an error indicating presence of a sensor white streak is notified. As a result, it is possible to correctly return the cause of the error when the sensor streak occurs after discriminating whether the type of the sensor streak is a black streak or a white streak. In the following, a description of the content common to the first exemplary embodiment is omitted, and only characteristic content of the second exemplary embodiment is described.

Flow of Sheet Contour Point Group Extraction Processing

Figure 9:
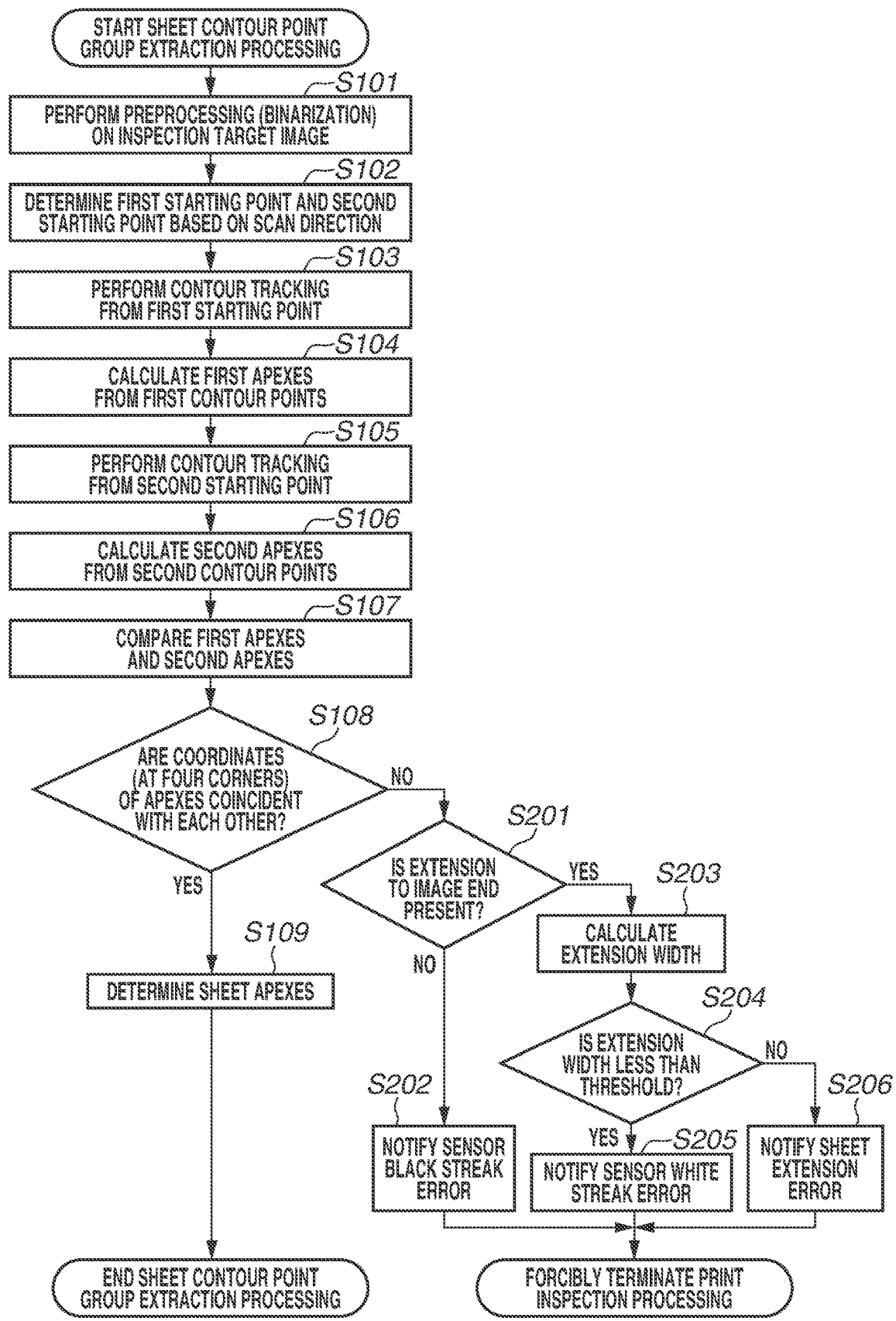
FIG. 9 is a flowchart illustrating sheet contour point group extraction processing according to a second exemplary embodiment.

FIG. 9 is a flowchart illustrating a detailed procedure of the sheet contour point group extraction processing according to the second exemplary embodiment. The description is given below based on the flowchart. Steps S101 to S109 are common to the first exemplary embodiment. Thus, the description of steps S101 to S109 is omitted, and steps added in the second exemplary embodiment are described below.

Processing in step S201 is performed in the case where the coordinates of the apexes are not coincident with each other in step S108. In step S201, it is determined whether an extension to the image end portion of the inspection target image is present. It is determined whether there is an extension to the image end portion based on whether the tracking point of the contour tracking reaches the image end portion.

Figure 10A:
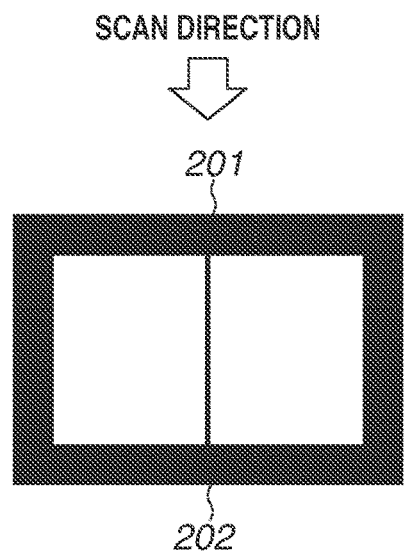
FIGS. 10A, 10B, and 10C each illustrate an example of an inspection target image according to the second exemplary embodiment.

In a case where an extension to the image end portion is absent in step S201 (NO in step S201), the processing proceeds to step S202. In step S202, a sensor black streak error is notified, and the print inspection processing is forcibly terminated. In the inspection target image at this time, the sensor black streak occurs at the center of the inspection target image, for example, as illustrated in FIG. 10A, and an extension is absent at each of image end portions 201 and 202.

In contrast, in a case where an extension to the image end portion is present in step S201 (YES in step S201), the processing proceeds to step S203. In step S203, an extension width is calculated. As the extension width, the number of continuous white pixels at the image end portion is calculated. For example, the extension width is calculated as three pixels.

Figure 10B:
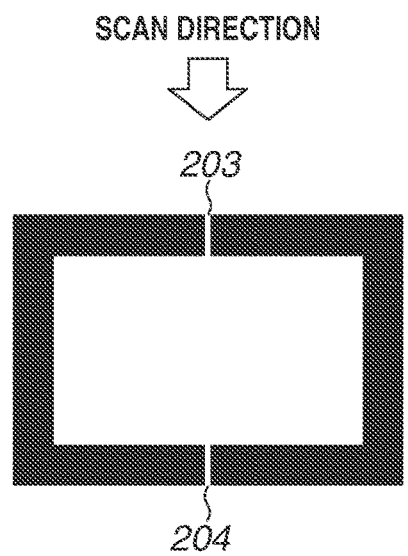

In a case where the extension width is less than a predetermined threshold in step S204 (YES in step S204), the processing proceeds to step S205. In step S205, a sensor white streak error is notified, and the print inspection processing is forcibly terminated. The predetermined threshold is, for example, ten pixels. In the inspection target image at this time, the sensor white streak occurs at the center of the inspection target image, for example, as illustrated in FIG. 10B, and there is an extension with a width less than the threshold at each of image end portions 203 and 204.

Figure 10C:
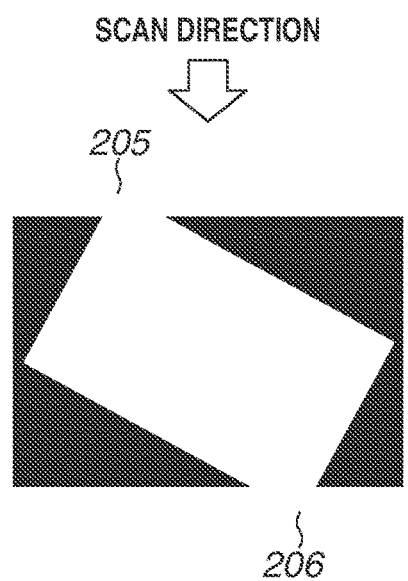

In contrast, in a case where the extension width is the threshold or more (NO in step S204), the processing proceeds to step S206. In step S206, a sheet extension error is notified, and the print inspection processing is forcibly terminated. In the inspection target image at this time, the sheet is inclined, for example, as illustrated in FIG. 10C, and there is an extension with a width greater than the threshold at each of image end portions 205 and 206.

The description of the flowchart of FIG. 9 ends.

Modifications

The determination whether the extension to the image end portion is present in step S201 may be performed when the contour tracking is performed in steps S103 and S105, as needed. In this case, when the pixel of the contour tracking destination reaches the image end portion of the inspection target image, the processing in steps S103 and S105 may be interrupted, and the processing may proceed to step S203 to calculate the extension width.

Figure 11:
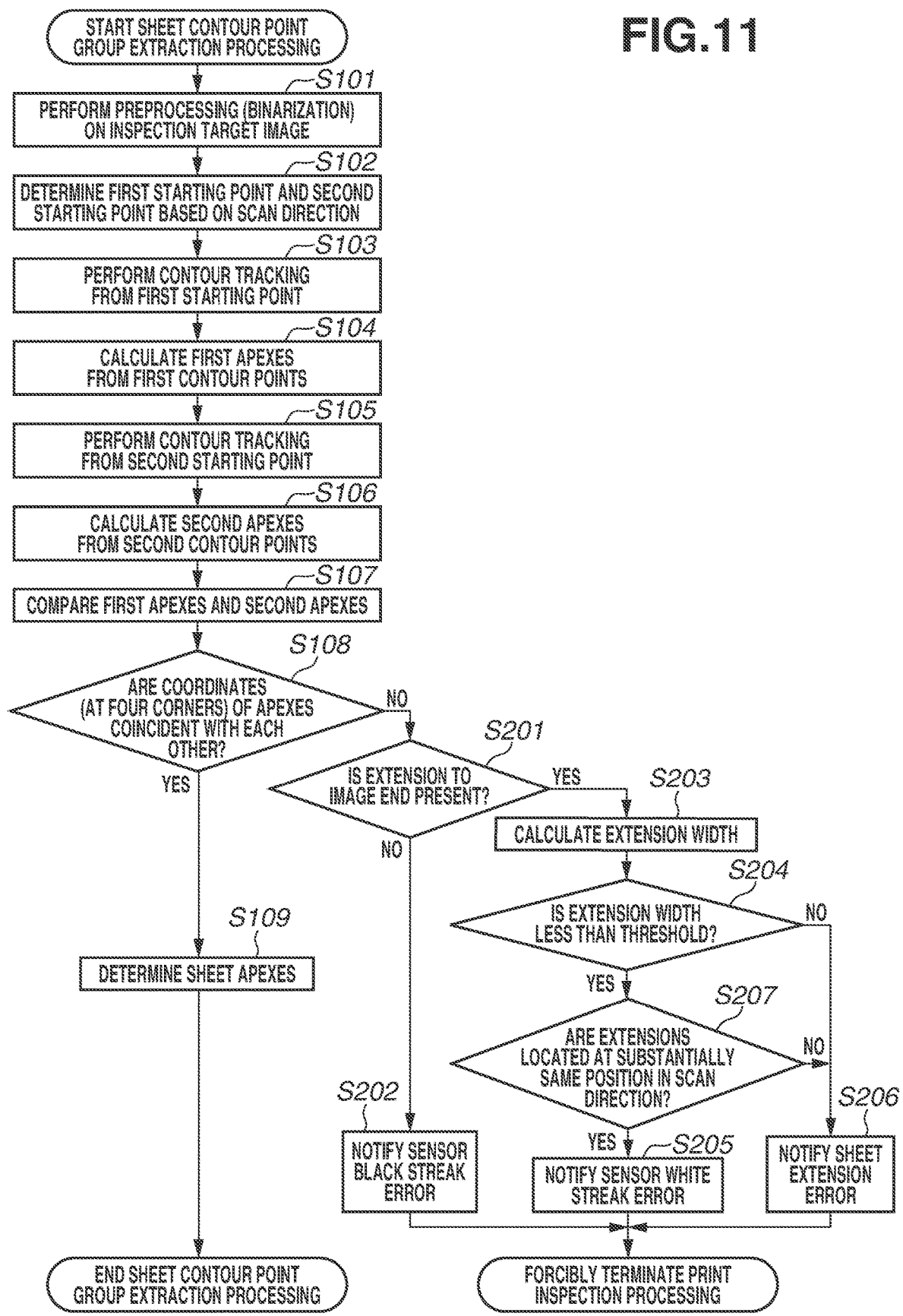
FIG. 11 is a flowchart illustrating sheet contour point group extraction processing according to a modification of the second exemplary embodiment.
Figure 12A:
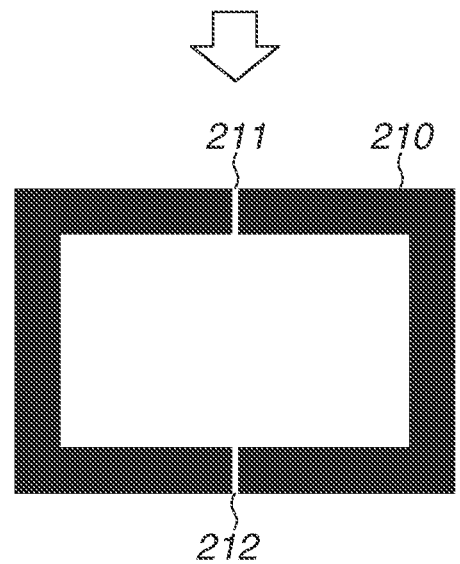
FIGS. 12A and 12B each illustrate an example of an inspection target image according to the modification of the second exemplary embodiment.
Figure 12B:
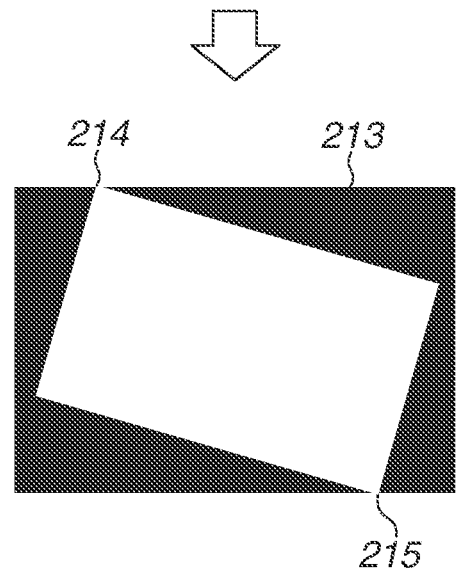

Furthermore, even when the extension width is small, in place of occurrence of the sensor streak, one corner of the sheet may slightly extend to the image end portion of the inspection target image due to large inclination of the sheet. To determine the state, processing in step S207 may be added to the processing flow in FIG. 9, as illustrated in FIG. 11. In step S207, in a case where extensions are located at the substantially same position in the direction orthogonal to the scan direction (YES in step S207), for example, as illustrated in FIG. 12A, the processing proceeds to step S205. In step S205, a sensor white streak error is notified. Otherwise (NO in step S207), for example, as illustrated in FIG. 12B, the processing proceeds to step S206. In step S206, a sheet extension error is notified. The determination regarding whether the extensions are located at the substantially same position is performed by comparing the predetermined number of pixels with a threshold, for example, 20 pixels. As described above, occurrence of the sensor streak and inclination of the sheet are discriminated from each other by using characteristics that sensor streaks occur in a substantially linear shape in the scan direction.

Exceptionally, depending on relative sizes of the sheet and the outer portion (black frame), and a relationship between inclination and a deviation amount of the sheet, only one of an upper end and a lower end of the sheet may slightly extend to the outer portion. In such a case, it is determined that a partial sensor streak occurs at one of the upper end and the lower end. However, in a case where a possibility of occurrence of the partial sensor streak is extremely low but sheet conveyance accuracy is remarkably deteriorated, it may be determined as an extension of the sheet even though the extension width is small.

As described above, according to the second exemplary embodiment, when the contour tracking of the sheet is performed on the inspection target image, it is determined whether the contour tracking destination extends to the image end portion of the scan image after it is determined that the contour points are not coincident with each other. Further, in the case where an extension is absent, the error indicating presence of the sensor black streak is notified, whereas in the case where a extension is present and the extension width is small, the error indicating presence of the sensor white streak is notified. As a result, it makes it possible to discriminate whether the type of the sensor streak is the black streak or the white streak, and to correctly return the cause of the error when the sensor streak occurs.

The first and second exemplary embodiments are basically premised on a state where the sensor streak occurs over the entire surface of the inspection target image in the scan direction, in particular, a case where the sensor streak occurs at two positions in the end portion of the image. Therefore, in a case of a partial sensor streak extending only into a part of the sheet contour, the positional coordinates of the first contour points and the corresponding positional coordinates of the second contour points are coincident with each other, and the partial sensor streak is not detected as a sensor streak.

In a third exemplary embodiment, in addition to the processing according to the first exemplary embodiment, the number of first contour points (apexes) and the number of second contour points (apexes) are calculated. In a case where the number of contour points is other than four, an error indicating presence of a partial sensor streak in a part of the sheet area is notified. As a result, even in the case where a partial sensor streak extending only into a part of the sheet contour is included in the inspection target image, it is possible to correctly return the cause of the error when the sensor streak occurs. In the following, the description of the content common to the first and second exemplary embodiments is omitted, and only characteristic content of the third exemplary embodiment is described.

Flow of Sheet Contour Point Group Extraction Processing

Figure 13:
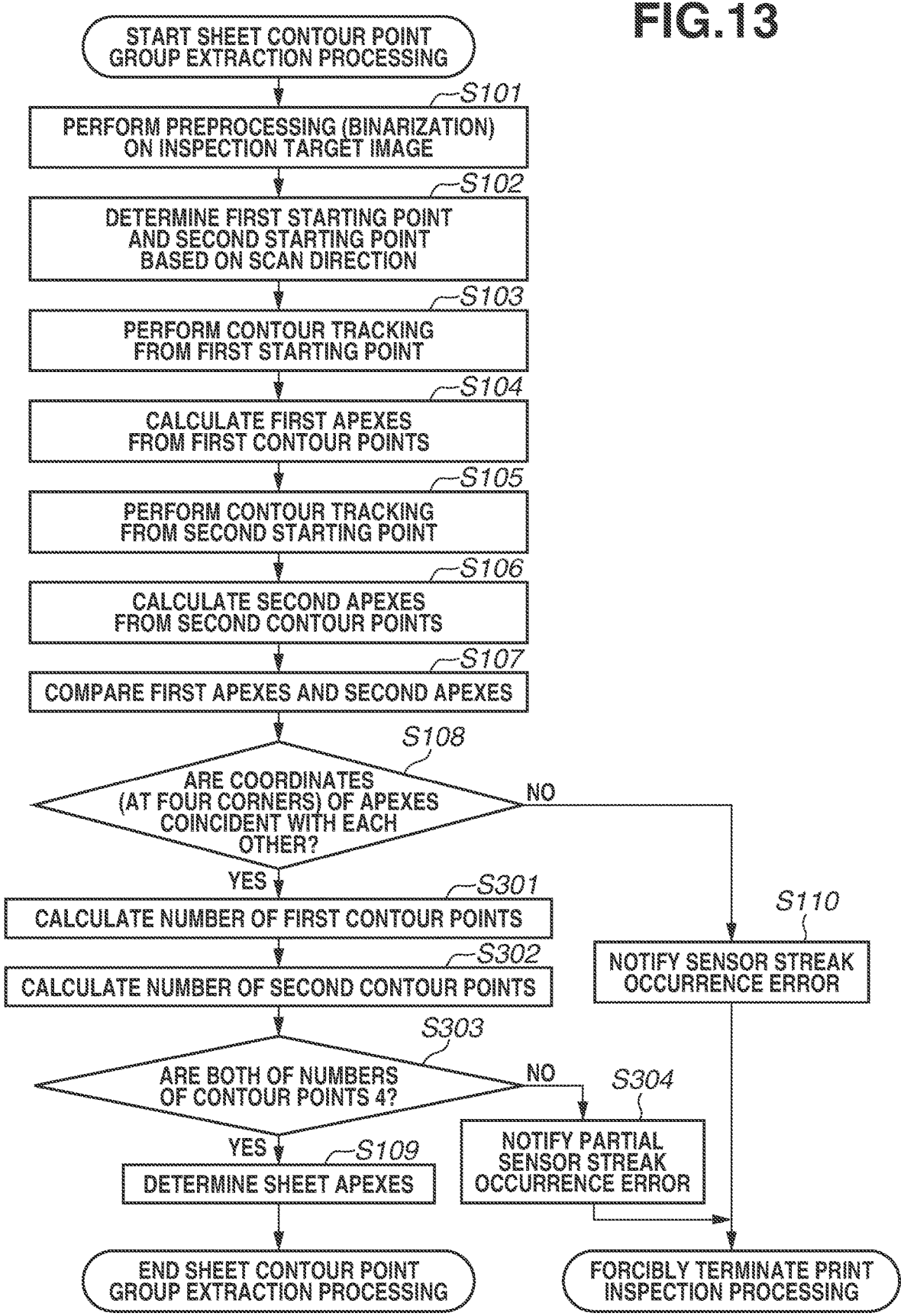
FIG. 13 is a flowchart illustrating sheet contour point group extraction processing according to a third exemplary embodiment.

FIG. 13 is a flowchart illustrating a detailed procedure of the sheet contour point group extraction processing according to the third exemplary embodiment. The description is given below based on the flowchart. Steps S101 to S110 are common to the first exemplary embodiment. Thus, the description of steps S101 to S110 is omitted, and steps added in the third exemplary embodiment are described below.

The added processing in and after step S301 is performed in the case where the positional coordinates of the contour points are coincident with each other in step S108.

In step S301, the number of first contour points is calculated. In this example, the first contour points correspond to the extracted apexes of the contour.

In step S302, the number of second contour points is calculated. In this example, the second contour points also correspond to the extracted apexes of the contour.

In step S303, it is determined whether the number of first contour points and the number of second contour points are both four. In a case where the number of first contour points and the number of second contour points are both four (YES in step S303), the processing proceeds to step S109. In step S109, the apexes of the sheet are determined, and the sheet contour point group extraction processing then ends.

In a case where both of the number of first contour points and the number of second contour points are not four (NO in step S303), the processing proceeds to step S304. In step S304, a partial sensor streak occurrence error is notified, and the print inspection processing is forcibly terminated. In the inspection target image at this time, a sensor black streak 216 or a sensor white streak 217 occurs in a part of the sheet contour, for example, as illustrated in FIGS. 14A and 14B. At this time, as illustrated by a plurality of white circles in FIGS. 14C and 14D respectively corresponding to FIGS. 14A and 14B, the number of first contour points and the number of second contour points are both eight.

As described above, in the case where the sensor black streak or the sensor white streak occurs in a part of the sheet contour, the positional coordinates of the first contour points and the positional coordinates of the second contour points are coincident with each other because the sheet area is represented by a closed plane. However, the number of first contour points and the number of second contour points are not four that is the number of contour points to be originally extracted in the sheet contour extraction, but eight. The partial sensor black streak and the partial sensor white streak are discriminated from each other by using such characteristics.

The description of the flowchart of FIG. 13 ends.

As described above, according to the third exemplary embodiment, when the sheet contour tracking is performed on the inspection target image, the number of first contour points and the number of second contour points are calculated. In the case where both of the number of first contour points and the number of second contour points are not four, an error indicating presence of the partial sensor streak in a part of the sheet area is notified. As a result, even in the case where the partial sensor streak extending only into a part of the sheet contour is included in the inspection target image, it makes it possible to correctly return the cause of the error when the sensor streak occurs.

In the third exemplary embodiment, it is possible to discriminate the partial sensor streak; however, it is not possible to discriminate whether the partial sensor streak is a white streak or a black streak.

In a fourth exemplary embodiment, in addition to the processing according to the first exemplary embodiment, a shape formed by the first contour points and a shape formed by the second contour points are determined. In a case where each of the shapes includes a concave portion, it is determined that the partial sensor streak is a sensor black streak. In a case where each of the shapes includes a convex portion, it is determined that the partial sensor streak is a sensor white streak. Further, an error indicating presence of the corresponding streak is notified. As a result, even in the case where the partial sensor streak extending only into a part of the sheet contour is included in the inspection target image, it is possible to discriminate whether the type of the sensor streak is the black streak or the white streak, and to correctly return the cause of the error when the sensor streak occurs. In the following, the description of the content common to the first to third exemplary embodiments is omitted, and only characteristic content of the fourth exemplary embodiment is described.

Flow of Sheet Contour Point Group Extraction Processing

Figure 15:
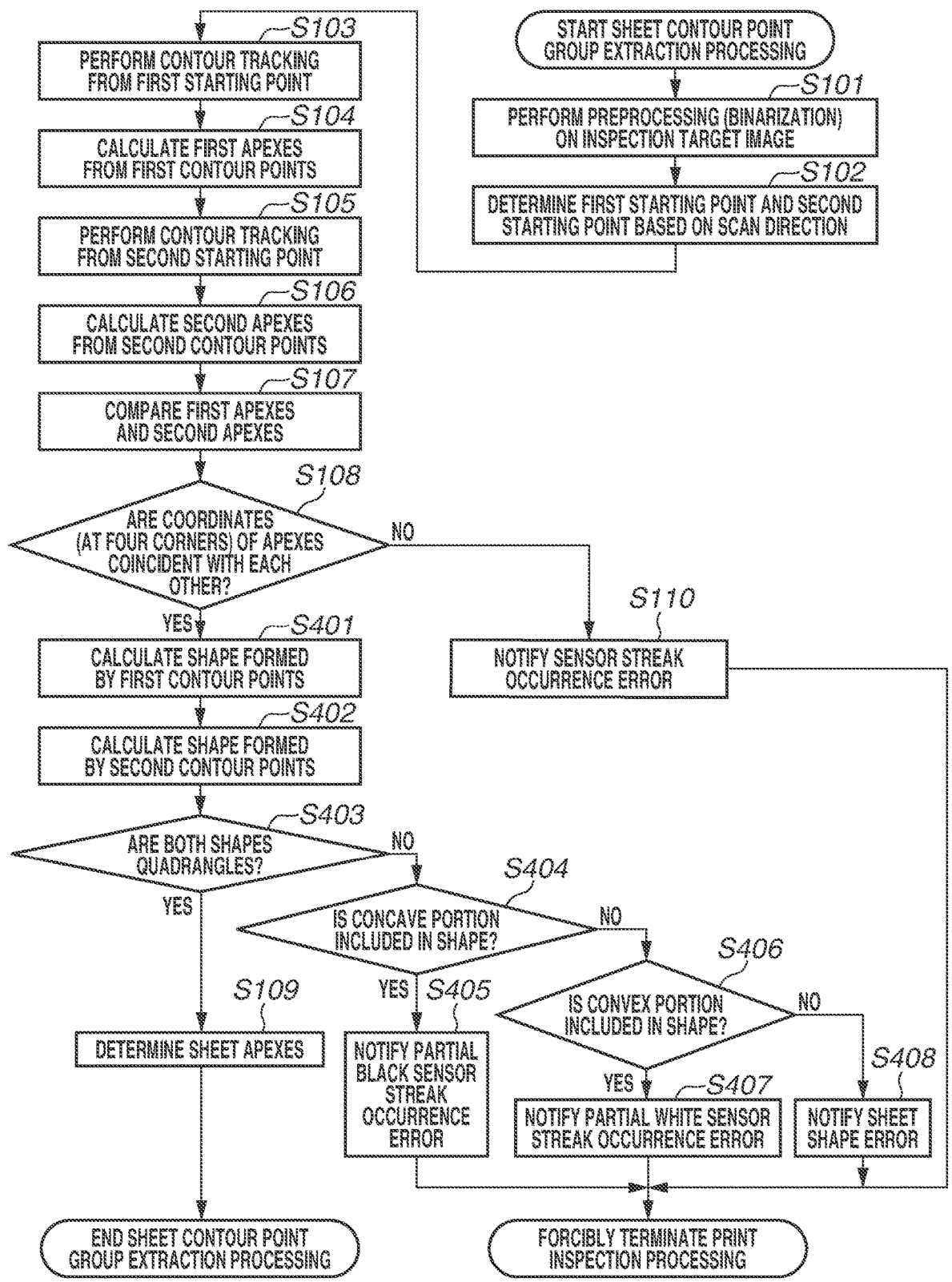
FIG. 15 is a flowchart illustrating a detailed procedure of sheet contour point group extraction processing according to a fourth exemplary embodiment.

FIG. 15 is a flowchart illustrating a detailed procedure of the sheet contour point group extraction processing according to the fourth exemplary embodiment. The description is given below based on the flowchart. Steps S101 to S110 are common to the first exemplary embodiment. Thus, the description of steps S101 to S110 is omitted, and steps added in the fourth exemplary embodiment are described below.

The added processing in and after step S401 is performed in the case where the positional coordinates of the contour points are coincident with each other in step S108.

In step S401, the shape formed by the first contour points is calculated. The shape is determined by analyzing geometric information such as the number of apexes, angles of the respective apexes, and lengths and directions of sides in a closed space area formed by the contour points.

In step S402, the shape formed by the second contour points is calculated. The calculation in this step is performed in a manner similar to the calculation of the shape formed by the first contour points.

In step S403, it is determined whether both of the shapes are quadrangles. In a case where both of the shapes formed by the groups of contour points are quadrangles (YES in step S403), the processing proceeds to step S109. In step S109, the apexes of the sheet are determined, and the sheet contour point group extraction processing then ends. In contrast, in a case where both of the shapes formed by the groups of contour points are not quadrangles (NO in step S403), the processing proceeds to step S404.

In step S404, it is determined whether each of the shapes includes a concave portion. In a case where each of the shapes does not include a concave portion as a result of analysis (NO in step S404), the processing proceeds to step S406. In contrast, in a case where each of the shapes includes a concave portion as a result of the analysis (YES in step S404), the processing proceeds to step S405. In step S405, a partial black sensor streak occurrence error is notified.

In step S406, it is determined whether each of the shapes includes a convex portion. In a case where each of the shapes includes a convex portion (YES in step S406), the processing proceeds to step S407. In step S407, a partial white sensor streak occurrence error is notified. In a case where each of the shapes does not include a convex portion (NO in step S406), the processing proceeds to step S408. In step S408, a sheet shape error is notified.

After the processing in each of steps S405, S407 and S408 ends, the print inspection processing is forcibly terminated.

For example, referring to FIGS. 14A to 14D, in the inspection target image at this time, the sensor black streak 216 or the sensor white streak 217 occurs in a part of the sheet contour as illustrated in FIGS. 14A and 14B. In the case of FIG. 14A, the shape formed by the contour points includes a concave portion because the sensor black streak 216 is present. In the case of FIG. 14B, the shape formed by the contour points includes a convex portion because the sensor white streak 217 is present.

As described above, in the case where the sensor black streak or the sensor white streak occurs in a part of the sheet contour, the sheet area is represented by a closed plane. Thus, the positional coordinates of the first contour points and the positional coordinates of the second contour points are coincident with each other. The shapes formed by the groups of contour points are supposed to be quadrangles; however, the shapes become different from a quadrangle, for example, a shape including a concave portion or a shape including a convex shape, in the sheet contour extraction. The partial sensor black streak and the partial sensor white streak are discriminated from each other by using such characteristics.

The description of the flowchart of FIG. 15 ends.

As described above, according to the fourth exemplary embodiment, when the sheet contour tracking is performed on the inspection target image, the shape formed by the first contour points and the shape formed by the second contour points are determined. In the case where each of the shapes includes a concave portion, it is determined that the partial sensor streak is the sensor black streak. In the case where each of the shapes includes the convex portion, it is determined that the partial sensor streak is the sensor white streak. An error indicating presence of the corresponding streak is then notified. As a result, even in the case where the partial sensor streak extending only into a part of the sheet contour is included in the inspection target image, it makes it possible to discriminate whether the type of the sensor streak is the black streak or the white streak, and to correctly return the cause of the error when the sensor streak occurs.

Other Exemplary Embodiments

In the above-described exemplary embodiments, the case where one sensor streak occurs is described as an example; however, embodiments of the present disclosure are applicable to a case where a plurality of sensor streaks occurs. The first apexes and the second apexes are compared in terms of positional relationship. In a case where a separation distance therebetween is large, it is determined that a non-extracted sheet area is present therebetween, and an error indicating that two or more sensor streaks may be present is notified. Alternatively, the contour extraction may be started from a starting point set outside of a side orthogonal to the scan direction of the non-extracted area, and the sheet contour of the non-extracted area may be tracked to analyze presence or absence of the sensor streak in more detail. The contour tracking processing is desirably recursively repeated until the non-extracted area is eliminated.

Furthermore, it may be determined, based on information on pixel values at the contour points, whether the contour points are present in the sheet area (pixel value is 1 or 255 (white)) or outside the sheet area (pixel value is 0 (black)), and presence or absence of the sensor streak may be analyzed in more detail based on a result of the determination.

Further, in the above-described exemplary embodiments, the description is given on the premise that the inspection target image includes a paper white portion around the sheet. In contrast, in a case of the inspection target image in which printing is performed on the entire sheet surface without margin, a position of the sheet may be separately acquired from a pattern and a set position, and a white pixel area may be added to a sheet peripheral portion to enable the contour tracking.

Further, depending on relative sizes of the sheet and an outer portion (black frame) of the sheet, and a relationship between inclination and a deviation amount of the sheet, only one of an upper end or a lower end of the sheet may slightly extend into the outer portion. In such a case, it is determined that a partial sensor streak occurs at any of the upper end or the lower end. However, in a case where a possibility of occurrence of the partial sensor streak is extremely low and sheet conveyance accuracy is remarkably deteriorated, it may be determined as an extension of the sheet even though the extension width is small.

According to the exemplary embodiments of the present disclosure, in the case where a sensor streak is included in an inspection target image, it is possible to return an appropriate error.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-091747, filed May 31, 2021, which is hereby incorporated by reference herein in its entirety.

What is claimed is:

1. An image processing apparatus, comprising:
   one or more processors; and
   at least one memory storing executable instructions, which when executed by the one or more processors, cause the image processing apparatus to perform operations comprising:
   acquiring a read image obtained by reading a printed document; and
   determining presence or absence of a streak included in the read image, by tracking a contour of the printed document from each of a plurality of points that are both end points of the read image in a direction orthogonal to a reading direction of the read image,
   wherein, in the determining, presence or absence of the streak is determined by comparing a first apex of the contour obtained by the tracking from a first point included in the both end points with a second apex of the contour obtained by the tracking from a second point included in the both end points.

2. The image processing apparatus according to claim 1, wherein the read image includes a sheet area of the printed document and a peripheral area.

3. The image processing apparatus according to claim 1, wherein the determining comprises comparing whether positional coordinates of contour points in a plurality of contour point groups of the printed document obtained as a result of the tracking are coincident in the read image, and
   wherein, in a case where the positional coordinates are not coincident with each other, the determining determines that the read image includes a streak.

4. The image processing apparatus according to claim 3, the operations further comprising:
   calculating a width of an extended portion extended from the printed document in the read image,
   wherein, in the determining, presence or absence of the streak is determined based on a result of the comparison and the width of the extended portion.

5. The image processing apparatus according to claim 3, the operations further comprising:
   calculating numbers of the contour points in the plurality of contour point groups; and
   comparing the numbers of contour points in the read image,
   wherein the determining determines that a partial streak is included in the read image, based on a result of the comparing the numbers of the contour points in the read image.

6. The image processing apparatus according to claim 3, the operations further comprising:
   calculating shapes of the printed document indicated by the plurality of contour point groups; and
   comparing the shapes in the read image,
   wherein the determining determines that a partial streak is included in the read image, based on a result of the comparing the shapes in the read image.

7. The image processing apparatus according to claim 3, wherein the plurality of contour point groups each includes apexes of the printed document.

8. The image processing apparatus according to claim 1, the operations further comprising notifying an error based on a result of the determination in the determining.

9. The image processing apparatus according to claim 8, wherein the determining continues determination on another portion other than a streak occurrence portion in the read image, based on a result of the notification in the notifying.

10. The image processing apparatus according to claim 1, wherein the determining determines that the read image does not include the streak in a case where the first apex and the second apex coincide with each other, and the determining determines that the read image includes the streak in a case where the first apex and the second apex do not coincide with each other.

11. The image processing apparatus according to claim 1, wherein the determining determines that the read image does not include the streak in a case where four apexes as the first apex coincide with four apexes as the second apex, and the determining determines that the read image includes the streak in a case where the four apexes as the first apex coincide with the four apexes as the second apex.

12. An image processing method, comprising:
   acquiring a read image obtained by reading a printed document; and
   determining presence or absence of a streak included in the read image by tracking a contour of the printed document from each of a plurality of points that are both end points of the read image in a direction orthogonal to a reading direction of the read image,
   wherein, in the determining, presence or absence of the streak is determined by comparing a first apex of the contour obtained by the tracking from a first point included in the both end points with a second apex of the contour obtained by the tracking from a second point included in the both end points.

13. A non-transitory computer-readable storage medium storing a program for causing a computer to execute an image processing method, the image processing method comprising:
    acquiring a read image obtained by reading a printed document; and
    determining presence or absence of a streak included in the read image by tracking a contour of the printed document from each of a plurality of points that are both end points of the read image in a direction orthogonal to a reading direction of the read image,
    wherein, in the determining, presence or absence of the streak is determined by comparing a first apex of the contour obtained by the tracking from a first point included in the both end points with a second apex of the contour obtained by the tracking from a second point included in the both end points.

\* \* \* \* \*